UNITED STATES PATENT OFFICE.

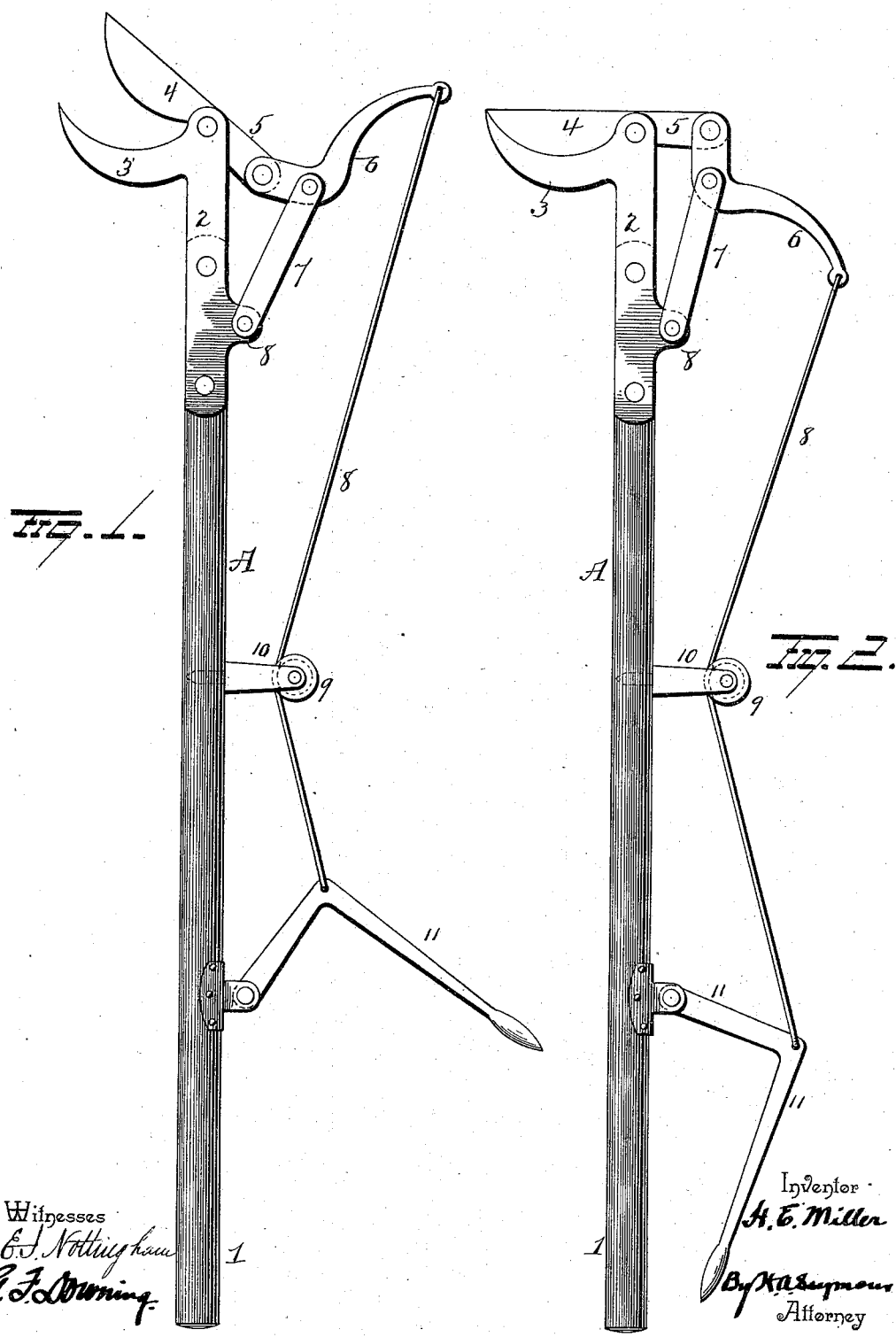

HENRY E. MILLER, OF PETERSBURG, OHIO.

PRUNING-SHEARS.

SPECIFICATION forming part of Letters Patent No. 565,684, dated August 11, 1896.

Application filed April 2, 1896. Serial No. 585,982. (No model.)

*To all whom it may concern:*

Be it known that I, HENRY E. MILLER, a resident of Petersburg, in the county of Mahoning and State of Ohio, have invented certain new and useful Improvements in Pruning-Shears; and I do hereby declare the following to be a full, clear, and exact description of the invention, such as will enable others skilled in the art to which it appertains to make and use the same.

My invention relates to an improvement in pruning-shears, the object of the invention being to so construct the device that a large amount of power can be applied to the movable blade, and so that this power can be maintained throughout the movement of said blade without appreciably increasing the applied force which operates the device as the blade approaches the end of its cutting movement.

A further object is to produce pruning-shears which shall be simple in construction, by means of which high limbs of a tree can be easily cut by an operator standing on the ground, and to so construct the device that it shall be effectual in all respects in the performance of its functions.

With these objects in view the invention consists in certain novel features of construction and combinations and arrangements of parts, as hereinafter set forth, and pointed out in the claim.

In the accompanying drawings, Figure 1 is a view of my improvement, showing the same open. Fig. 2 is a similar view, showing the same closed.

A represents a pole having a handle 1 at its lower end. To the upper or forward end of the pole A a bar 2 is secured and provided at its free end with a laterally-projecting curved arm, which constitutes the rigid jaw 3 of the shears. To the bar 2, immediately in rear of the rigid jaw 3, the movable blade 4 is pivotally connected so that its shank 5 will project from said bar in the opposite direction from the rigid jaw 3. To the free end of the shank 5 of the movable blade 4 one end of an S-shaped lever 6 is pivotally connected, and to said lever at a point between the ends thereof one end of a bar or post 7 is pivoted, the other end of said bar or post 7 being pivoted to a lug on the bar 2 and constituting a movable fulcrum for the S-shaped lever 6.

To the free end of the S-shaped lever 6 one end of a steel rod or wire 8 is secured. The rod or wire 8 passes over a pulley 9, mounted in a bracket 10, secured to the pole A, and at its inner or lower end said rod or wire is attached to an L-shaped lever 11 at the juncture of the two arms thereof, said lever 11 being pivotally connected to the pole A at a point in proximity to the handle 1.

From the construction and arrangement of parts above described it will be seen that when the lever 11 is moved downwardly the lever 6 will be turned on its pivotal connection with the bar or post 7 and cause the movable blade 4 to turn on its pivotal connection with the bar 2 and approach the rigid jaw 3, cutting during such movement the limb or other device inserted between said blade and jaw. During the movement of the blade 4 in the act of cutting the limb the fulcrum of the lever 6 will move in the arc of a circle and the leverage or power applied to the blade will be maintained and, in fact, increased as the blade reaches the end of its cutting movement without the necessity of the operator increasing his exertions to increase the applied force for operating the device.

My improvements are very simple in construction, comprise few parts, and are effectual in all respects in the performance of their functions.

Slight changes might be made in the details of construction without departing from the spirit thereof or limiting its scope, and hence I do not wish to limit myself to the precise details herein set forth; but, Having fully described my invention, what I claim as new, and desire to secure by Letters Patent, is—

The combination with a pole having a horizontally-disposed jaw at or near its upper end, said jaw curved downwardly from the extreme upper end of the pole whereby a shoulder is formed at that point, a blade pivoted to said extreme upper end and adapted to coöperate with the jaw, one end of the blade projecting beyond the pivot, a lever pivoted at one end to said end, and a link pivoted to the pole and upon the upper end of which said lever is fulcrumed, of an L-shaped hand-lever pivoted at one end to the pole, a wire or connection extending from the outer end of the first-mentioned lever, to the angle of the L-shaped hand-lever, and a roller against which said connection operates, substantially as set forth.

In testimony whereof I have signed this specification in the presence of two subscribing witnesses.

HENRY E. MILLER.

Witnesses:
E. A. C. HAHN,
L. W. SCHOLL.